United States Patent
Sun

(10) Patent No.: US 11,146,611 B2
(45) Date of Patent: Oct. 12, 2021

(54) LIP SYNCHRONIZATION OF AUDIO AND VIDEO SIGNALS FOR BROADCAST TRANSMISSION

(71) Applicant: HUAWEI TECHNOLOGIES CO., LTD., Shenzhen (CN)

(72) Inventor: Tao Sun, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 90 days.

(21) Appl. No.: 16/496,306

(22) PCT Filed: Mar. 23, 2017

(86) PCT No.: PCT/CN2017/077925
§ 371 (c)(1),
(2) Date: Sep. 20, 2019

(87) PCT Pub. No.: WO2018/170852
PCT Pub. Date: Sep. 27, 2018

(65) Prior Publication Data
US 2020/0099734 A1   Mar. 26, 2020

(51) Int. Cl.
*H04L 29/06* (2006.01)
*H04W 4/80* (2018.01)
(Continued)

(52) U.S. Cl.
CPC .......... *H04L 65/608* (2013.01); *H04J 3/0673* (2013.01); *H04J 3/0697* (2013.01);
(Continued)

(58) Field of Classification Search
CPC ............... H04L 65/608; H04L 65/1003; H04L 65/4076; H04L 67/02; H04L 69/18; H04L 69/28; H04H 20/18; H04H 60/82; H04N 21/236; H04N 21/2362; H04N 21/2381; H04N 21/2383; H04N 21/242;
(Continued)

(56) References Cited

U.S. PATENT DOCUMENTS

2003/0066094 A1   4/2003 Van Der Schaar et al.
2005/0177643 A1   8/2005 Xu
(Continued)

FOREIGN PATENT DOCUMENTS

CN   1588989 A   3/2005
CN   1949879 A   4/2007
(Continued)

*Primary Examiner* — Ian N Moore
*Assistant Examiner* — Rushil Parimal Sampat
(74) *Attorney, Agent, or Firm* — Stein IP, LLC

(57) ABSTRACT

A multi-device lip synchronization method and a device. A secondary device receives an RTCP packet sent by a primary device. The secondary device corrects an STC of the secondary device based on a PCR in the RTCP packet, a program dock frequency of the primary device, a program dock frequency of the secondary device, and an RTCP delay. Then, the secondary device receives RTPs published by the primary device, splice the RTPs into a complete audio data frame, and store the audio data frame into a PCM buffer of the secondary device. The secondary device outputs the audio data frame in the PCM buffer.

16 Claims, 8 Drawing Sheets

(51) Int. Cl.
*H04J 3/06* (2006.01)
*H04N 5/926* (2006.01)
*H04N 21/242* (2011.01)
*H04N 21/43* (2011.01)
*H04N 21/6437* (2011.01)
*H04L 12/28* (2006.01)

(52) U.S. Cl.
CPC .......... *H04L 12/2874* (2013.01); *H04L 69/28* (2013.01); *H04N 5/9267* (2013.01); *H04N 21/242* (2013.01); *H04N 21/4307* (2013.01); *H04N 21/6437* (2013.01); *H04W 4/80* (2018.02)

(58) Field of Classification Search
CPC ......... H04N 21/6437; H04N 21/64707; H04N 21/8456; H04N 21/85403; H04N 21/8547; H04N 21/4307; H04N 21/42203; H04N 21/439; H04N 21/8106; H04N 21/8358; H04R 29/00; H04R 2201/107; C10L 21/047; C10L 13/08
See application file for complete search history.

(56) References Cited

U.S. PATENT DOCUMENTS

| | | |
|---|---|---|
| 2005/0259946 A1 | 11/2005 | Kitamura |
| 2006/0291466 A1* | 12/2006 | May, Jr. .................. H04L 65/80 370/390 |
| 2007/0081562 A1 | 4/2007 | Ma |
| 2008/0304571 A1 | 12/2008 | Tsukagoshi et al. |
| 2009/0100147 A1* | 4/2009 | Igarashi ............. H04N 21/6408 709/218 |
| 2014/0270196 A1* | 9/2014 | Braho ................... G10L 21/047 381/56 |
| 2016/0156950 A1* | 6/2016 | Bangma ............. H04N 21/4302 725/116 |
| 2016/0315991 A1* | 10/2016 | Oh ..................... H04N 21/2362 |
| 2019/0116395 A1* | 4/2019 | Kerdranvat ........ H04N 21/8106 |

FOREIGN PATENT DOCUMENTS

| | | |
|---|---|---|
| CN | 101123611 A | 2/2008 |
| CN | 101179484 A | 5/2008 |
| CN | 101237586 A | 8/2008 |
| CN | 101288257 A | 10/2008 |
| CN | 101710997 A | 5/2010 |
| CN | 101848396 A | 9/2010 |
| CN | 102421035 A | 4/2012 |
| CN | 102547299 A | 7/2012 |
| CN | 102665141 A | 9/2012 |
| CN | 103428584 A | 12/2013 |
| CN | 103888813 A | 6/2014 |
| EP | 0602943 A2 | 6/1994 |
| EP | 2254342 A1 | 11/2010 |
| JP | 2001358685 A | 12/2001 |
| WO | 2007023378 A2 | 3/2007 |

* cited by examiner

LIP SYNCHRONIZATION OF AUDIO AND VIDEO SIGNALS FOR BROADCAST TRANSMISSION

CROSS REFERENCE TO RELATED APPLICATIONS

This application is a national stage of International Application No. PCT/CN2017/077925, filed on Mar. 23, 2017, which is hereby incorporated by reference in its entirety.

TECHNICAL FIELD

Embodiments of the present invention relate to the field of communications technologies, and in particular, to a multi-device lip synchronization method and a device.

BACKGROUND

As Wi-Fi speakers and Bluetooth speakers are widely applied, an increasing quantity of users favor an application in which an audio and video playing device sends audio data to a Wi-Fi speaker or a Bluetooth speaker in a wireless connection manner, and then the audio and video playing device plays a video and the Wi-Fi speaker or the Bluetooth speaker plays audio. In this application, a most important issue is to ensure lip synchronization, so that a user can obtain good use experience.

In an existing process of using a Bluetooth speaker, a Bluetooth driver module in the audio and video playing device reads audio pulse code modulation (PCM) data from an audio PCM buffer of the audio and video playing device, and sends the audio PCM data to the Bluetooth speaker in real time by using a Bluetooth protocol. A Bluetooth audio driver module in the Bluetooth speaker receives the PCM data according to the Bluetooth protocol, and sends the PCM data to an audio PCM buffer of the Bluetooth speaker in real time. A PCM play driver module in the Bluetooth speaker directly reads the audio PCM data from the audio PCM buffer of the Bluetooth speaker and plays and outputs the audio PCM data.

It may be learned that the Bluetooth speaker resolves only a problem of cross-device audio output, but cannot implement lip synchronization between devices. The same is true when the foregoing method is applied to a Wi-Fi speaker. In addition, for the Wi-Fi speaker, a forwarding delay of a Wi-Fi router further exacerbates asynchronization between audio output and video output. Therefore, how to implement multi-device lip synchronization is a problem that needs to be resolved.

SUMMARY

Embodiments of the present invention provide a multi-device lip synchronization method and a device, to resolve a problem of how to implement lip synchronization when a plurality of devices synchronously play a video and audio.

According to a first aspect, an embodiment of the present invention provides a multi-device lip synchronization method, where the method is used by a primary device to synchronously output audio and a video to at least one secondary device, and includes: receiving, by the secondary device, a Real-Time Control Protocol RTCP packet sent by the primary device, where a real-time streaming packet RTP time stamp header field in the RTCP packet carries a program clock reference PCR cyclically collected by the primary device, and a Network Time Protocol NTP field in the RTCP packet carries a sending time point of the RTCP packet; correcting, by the secondary device, a system clock STC of the secondary device based on the PCR, a program clock frequency of the primary device, a program clock frequency of the secondary device, and an RTCP delay; receiving, by the secondary device based on a multicast service address and port sent by the primary device, RTPs published by the primary device, splicing the RTPs into a complete audio data frame, obtaining, from a time stamp header field of the RTP packet, a presentation time stamp PTS corresponding to the audio data frame, and putting the audio data frame into an audio pulse code modulation PCM buffer of the secondary device; and outputting, by the secondary device, the audio data frame in the audio PCM buffer based on the STC of the secondary device and the presentation time stamp of the audio data frame. Therefore, the primary device drives the secondary device, so that audio data and video data are synchronously output. This implements lip synchronization between the primary device and the secondary device, and provides good use experience for a user.

In a possible design, the RTCP packet carries an RTCP session identifier, and before the correcting, by the secondary device, a system clock STC of the secondary device based on the PCR, a program clock frequency of the primary device, a program clock frequency of the secondary device, and an RTCP delay, the method further includes: sending, by the secondary device, an RTCP session join request to the primary device, so that the primary device sends the RTCP session identifier to the secondary device.

In a possible design, the correcting, by the secondary device, a system clock STC of the secondary device based on the PCR, a program clock frequency of the primary device, a program clock frequency of the secondary device, and an RTCP delay includes: calculating, by the secondary device, an STC correction value scr_correct of the secondary device according to the following formula:

$$\text{scr\_correct} = \text{scr\_srv} \times \text{scf\_clt}/\text{scf\_srv} + (\text{ntp\_rcv} - \text{ntp\_snd}) \times \text{scf\_clt}/1000, \text{ where}$$

scf_clt is the program clock frequency of the secondary device, scf_srv is the program clock frequency of the primary device, ntp_rcv is a moment at which the RTCP packet is received, and scr_srv and ntp_snd are sending time points of the PCR and the RTCP packet, respectively; and correcting, by the secondary device, the STC of the secondary device based on the calculated STC correction value.

In a possible design, before the receiving, by the secondary device, a Real-Time Control Protocol RTCP packet sent by the primary device, the method further includes: receiving, by the secondary device, media description information sent by the primary device, where the media description information includes a Simple Network Time Protocol SNTP service address and port, an RTCP service address and port, the multicast service address and port, the program clock frequency of the primary device, a media format, and a time stamp frequency; and performing, by the secondary device, system time synchronization based on the SNTP service address and port; and the receiving, by the secondary device, a Real-Time Control Protocol RTCP packet sent by the primary device includes:

receiving, by the secondary device based on the RTCP service address and port, the RTCP packet sent by the primary device.

According to a second aspect, an embodiment of the present invention provides a multi-device lip synchronization method, where the method is used by a primary device to synchronously output audio and a video to at least one secondary device, and includes: collecting, by the primary device, a program clock reference PCR based on a preset collection cycle; sending, by the primary device, a Real-Time Control Protocol RTCP packet to the secondary device when determining that a preset condition is met, where a real-time streaming packet RTP time stamp header field in the RTCP packet carries the PCR, and a Network Time Protocol NTP field in the RTCP packet carries a sending time point of the RTCP packet, so that the secondary device corrects a system clock STC of the secondary device based on the PCR, a program clock frequency of the primary device, a program clock frequency of the secondary device, and an RTCP delay; and copying, by the primary device, an audio data frame from an audio pulse code modulation PCM buffer of the primary device, packing the audio data frame into real-time streaming packets RTPs, and publishing the RTPs to a multicast service address and port, where a time stamp header field of the RTP carries a presentation time stamp corresponding to the audio data frame, so that the secondary device receives the RTPs based on the multicast service address and port. Therefore, the primary device drives the secondary device, so that audio data and video data are synchronously output. This implements lip synchronization between the primary device and the secondary device, and provides good use experience for a user.

In a possible design, the RTCP packet carries an RTCP session identifier, and before the sending, by the primary device, a Real-Time Control Protocol RTCP packet to the secondary device when determining that a preset condition is met, the method further includes: receiving, by the primary device, an RTCP session join request sent by the secondary device, and sending the RTCP session identifier to the secondary device.

In a possible design, before the collecting, by the primary device, a program clock reference PCR based on a preset collection cycle, the method further includes: sending, by the primary device, media description information to the secondary device, where the media description information includes a Simple Network Time Protocol SNTP service address and port, an RTCP service address and port, the multicast service address and port, the program clock frequency of the primary device, a media format, and a time stamp frequency, the SNTP service address and port is used by the secondary device to perform system time synchronization, and the RTCP service address and port is used by the secondary device to receive, based on the RTCP service address and port, the RTCP packet sent by the primary device.

In a possible design, the preset condition is: a deviation between an actual PCR collection time interval of the primary device and the preset collection cycle is greater than a preset threshold.

In a possible design, the preset threshold is 20 ms, and the preset condition is:

$$(\text{scr\_curr}-\text{scr\_last}) \times 1000/\text{scf\_srv} < (\text{cycle\_read\_}x-20);$$
or
$$(\text{scr\_curr}-\text{scr\_last}) \times 1000/\text{scf\_srv} > (\text{cycle\_read\_}x+20),$$
where scr_curr is a currently collected clock value, scr_last is a previously collected clock value, scf_srv is the program clock frequency of the primary device, and cycle_read_x is the preset collection cycle.

According to a third aspect, an embodiment of the present invention provides a secondary device, including:

a first receiving module, configured to receive a Real-Time Control Protocol RTCP packet sent by a primary device, where a real-time streaming packet RTP time stamp header field in the RTCP packet carries a program clock reference PCR cyclically collected by the primary device, and a Network Time Protocol NTP field in the RTCP packet carries a sending time point of the RTCP packet; a correction module, configured to correct a system clock STC of the secondary device based on the PCR, a program clock frequency of the primary device, a program clock frequency of the secondary device, and an RTCP delay; a second receiving module, configured to receive, based on a multicast service address and port sent by the primary device, RTPs published by the primary device; a processing module, configured to: splice the RTPs into a complete audio data frame, obtain, from a time stamp header field of the RTP packet, a presentation time stamp PTS corresponding to the audio data frame, and put the audio data frame into an audio pulse code modulation PCM buffer of the secondary device; and an output module, configured to output the audio data frame in the audio PCM buffer based on the STC of the secondary device and the presentation time stamp of the audio data frame. Therefore, the primary device drives the secondary device, so that audio data and video data are synchronously output. This implements lip synchronization between the primary device and the secondary device, and provides good use experience for a user.

In a possible design, the RTCP packet carries an RTCP session identifier, and the secondary device further includes: a sending module, configured to send an RTCP session join request to the primary device before the correction module corrects the system clock STC of the secondary device based on the PCR, the program clock frequency of the primary device, the program clock frequency of the secondary device, and the RTCP delay, so that the primary device sends the RTCP session identifier to the secondary device.

In a possible design, the correction module is specifically configured to: calculate an STC correction value scr_correct of the secondary device according to the following formula:

$$\text{scr\_correct}=\text{scr\_srv} \times \text{scf\_clt}/\text{scf\_srv}+(\text{ntp\_rcv}-\text{ntp\_snd}) \times \text{scf\_clt}/1000, \text{ where}$$

scf_clt is the program clock frequency of the secondary device, scf_srv is the program clock frequency of the primary device, ntp_rcv is a moment at which the RTCP packet is received, and scr_srv and ntp_snd are sending time points of the PCR and the RTCP packet, respectively; and correct the STC of the secondary device based on the calculated STC correction value.

In a possible design, the first receiving module is further configured to: before receiving the Real-Time Control Protocol RTCP packet sent by the primary device, receive media description information sent by the primary device, where the media description information includes a Simple Network Time Protocol SNTP service address and port, an RTCP service address and port, the multicast service address and port, the program clock frequency of the primary device, a media format, and a time stamp frequency; and the processing module is further configured to perform system time synchronization based on the SNTP service address and port; and the first receiving module is specifically configured to receive, based on the RTCP service address and port, the RTCP packet sent by the primary device.

According to a fourth aspect, an embodiment of the present invention provides a primary device, including: a collection module, configured to collect a program clock reference PCR based on a preset collection cycle; a sending module, configured to send a Real-Time Control Protocol RTCP packet to a secondary device when it is determined that a preset condition is met, where a real-time streaming packet RTP time stamp header field in the RTCP packet carries the PCR, and a Network Time Protocol NTP field in the RTCP packet carries a sending time point of the RTCP packet, so that the secondary device corrects a system clock STC of the secondary device based on the PCR, a program clock frequency of the primary device, a program clock frequency of the secondary device, and an RTCP delay; and a processing module, configured to: copy an audio data frame from an audio pulse code modulation PCM buffer of the primary device, pack the audio data frame into real-time streaming packets RTPs, and publish the RTPs to a multicast service address and port, where a time stamp header field of the RTP carries a presentation time stamp corresponding to the audio data frame, so that the secondary device receives the RTPs based on the multicast service address and port. Therefore, the primary device drives the secondary device, so that audio data and video data are synchronously output. This implements lip synchronization between the primary device and the secondary device, and provides good use experience for a user.

In a possible design, the RTCP packet carries an RTCP session identifier, and the primary device further includes: a receiving module, configured to: before the sending module sends the Real-Time Control Protocol RTCP packet to the secondary device when determining that the preset condition is met, receive an RTCP session join request sent by the secondary device, and send the RTCP session identifier to the secondary device.

In a possible design, the sending module is further configured to: send media description information to the secondary device before the collection module collects the program clock reference PCR based on the preset collection cycle, where the media description information includes a Simple Network Time Protocol SNTP service address and port, an RTCP service address and port, the multicast service address and port, the program clock frequency of the primary device, a media format, and a time stamp frequency, the SNTP service address and port is used by the secondary device to perform system time synchronization, and the RTCP service address and port is used by the secondary device to receive, based on the RTCP service address and port, the RTCP packet sent by the primary device.

In a possible design, the preset condition is: a deviation between an actual PCR collection time interval of the primary device and the preset collection cycle is greater than a preset threshold.

In a possible design, the preset threshold is 20 ms, and the preset condition is:

$$(scr\_curr-scr\_last) \times 1000/scf\_srv < (cycle\_read\_x-20);$$
or $$(scr\_curr-scr\_last) \times 1000/scf\_srv > (cycle\_read\_x+20),$$
where scr_curr is a currently collected clock value, scr_last is a previously collected clock value, scf_srv is the program clock frequency of the primary device, and cycle_read_x is the preset collection cycle.

According to a fifth aspect, an embodiment of the present invention provides a terminal, including: a receiver, a processor, and a transmitter. The receiver is configured to receive data from outside of the terminal. The transmitter is configured to send data to an external device. The processor is configured to perform the method according to the first aspect or the second aspect.

An embodiment of the present invention further provides a computer storage medium, configured to store a computer software instruction used by the secondary device or the primary device in any of the foregoing aspects, and the computer software instruction includes a method or a program designed for performing the foregoing aspect.

An embodiment of the present invention further provides a data processing system, including a module configured to perform the method according to the first aspect or the second aspect.

An embodiment of the present invention further provides a computer program, configured to perform the method according to the first aspect or the second aspect.

DESCRIPTION OF EMBODIMENTS

The technical solutions in the embodiments of the present invention may be applied to various communications systems in a wireless cellular network, for example, a Global System for Mobile Communications (GSM), a Code Division Multiple Access (CDMA) system, a Wideband Code Division Multiple Access (WCDMA) system, a general packet radio service (GPRS) system, an LTE system, and a Universal Mobile Telecommunications System (UMTS). This is not limited in the embodiments of the present invention.

The technical solutions in the embodiments of the present invention are mainly applied to a scenario of how to ensure lip synchronization when a primary device and one or more secondary devices synchronously play video data and audio data. Lip synchronization means that video data played by the primary device synchronizes with audio data played by the secondary device, so that a playing effect that a lip movement synchronizes with voice can be achieved when a user is watching a video. The primary device is connected to the secondary device through Wi-Fi or in another manner. The primary device plays video data and the secondary device plays audio data. The primary device supports audio and video output synchronization, such as a mobile phone, a set-top box (STB), or a television box (Over The Top, OTT). The secondary device may be a device such as a Wi-Fi speaker, and the secondary device can play audio data.

According to a multi-device lip synchronization method and a device that are provided in the embodiments of the present invention, one primary device can drive a plurality of secondary devices, so that audio data and video data are synchronously output. This implements lip synchronization between the primary device and the secondary devices, and provides good use experience for a user. The technical solutions provided in the embodiments of the present invention are described in detail below with reference to the accompanying drawings.

Figure 1:
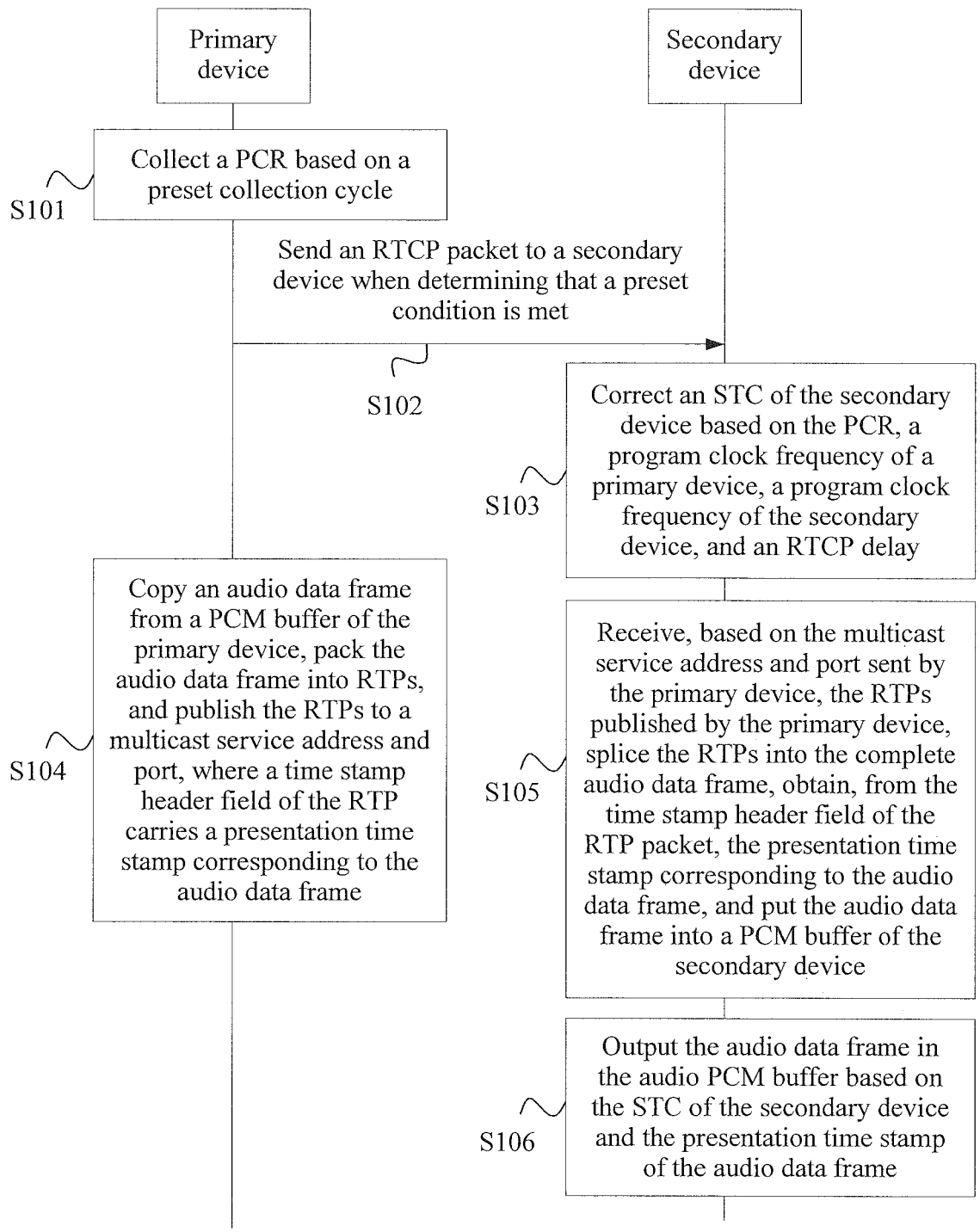
FIG. 1 is a schematic flowchart of Embodiment 1 of a multi-device lip synchronization method according to an embodiment of the present invention.

FIG. 1 is a schematic flowchart of Embodiment 1 of a multi-device lip synchronization method according to an embodiment of the present invention. The method is used by a primary device to synchronously output audio and a video to at least one secondary device, and as shown in FIG. 1, includes the following steps.

S101. The primary device collects a program clock reference (PCR) based on a preset collection cycle.

S102. The primary device determines, based on the collected PCR, whether a preset condition is met, and sends a Real-Time Control Protocol (RTCP) packet to the secondary device when the preset condition is met, where a real-time streaming packet RTP time stamp header field in the RTCP packet carries the PCR, and a Network Time Protocol (NTP) field in the RTCP packet carries a sending time point of the RTCP packet.

The preset condition is: a deviation between an actual PCR collection time interval of the primary device and the preset collection cycle is greater than a preset threshold. The preset threshold is, for example, a value ranging from −60 ms to 20 ms. 20 ms is used as an example, and the preset condition is:

(scr_curr−scr_last)×1000/scf_srv<(cycle_read_x−20);
or (scr_curr−scr_last)×1000/scf_srv>(cycle_read_x+20),
where scr_curr is a currently collected clock value, scr_last is a previously collected clock value, scf_srv is a program clock frequency of the primary device, and cycle_read_x is the preset collection cycle.

S103. The secondary device receives the RTCP packet sent by the primary device, and the secondary device corrects a system clock (System Time Clock, STC) of the secondary device based on the PCR, a program clock frequency of the primary device, a program clock frequency of the secondary device, and an RTCP delay.

Because the real-time streaming packet RTP time stamp header field in the RTCP packet carries the PCR, and the NTP field in the RTCP packet carries the sending time point of the RTCP packet, after the secondary device receives the RTCP packet, the secondary device may obtain the PCR, the sending time point of the RTCP packet, and a moment at which the RTCP packet is received. The RTCP delay is an RTCP transmission delay, and is a difference between the sending time point of the RTCP packet and the moment at which the RTCP packet is received.

The RTCP packet carries an RTCP session identifier, and the RTCP session identifier is an identifier allocated by the primary device to distinguish between different secondary devices. Specifically, the secondary device sends an RTCP session join request to the primary device, and the primary device sends the RTCP session identifier to the secondary device after receiving the RTCP session join request. Then, the RTCP session identifier is added to the RTCP packet sent by the primary device to the secondary device.

Specifically, the secondary device may calculate an STC correction value scr_correct of the secondary device according to the following formula:

scr_correct=scr_srv×scf_clt/scf_srv+(ntp_rcv−ntp_snd)×scf_clt/1000, where scf_clt is the program clock frequency of the secondary device, scf_srv is the program clock frequency of the primary device, ntp_rcv is the moment at which the RTCP packet is received, and scr_srv and ntp_snd are sending time points of the PCR and the RTCP packet, respectively.

Then, the secondary device corrects the STC of the secondary device based on the calculated STC correction value.

S104. The primary device copies an audio data frame from an audio pulse code modulation (PCM) buffer of the primary device, packs the audio data frame into real-time streaming packets (Real Time Packet, RTP), and publishes the RTPs to a multicast service address and port, where a time stamp header field of the RTP carries a presentation time stamp corresponding to the audio data frame.

S105. The secondary device receives, based on the multicast service address and port sent by the primary device, the RTPs published by the primary device, splices the RTPs into the complete audio data frame, obtains, from the time stamp header field of the RTP packet, the presentation time stamp corresponding to the audio data frame, and puts the audio data frame into a PCM buffer of the secondary device. The audio data frame is, for example, an audio frame.

S106. The secondary device outputs the audio data frame in the audio PCM buffer based on the STC of the secondary device and the presentation time stamp of the audio data frame.

Specifically, the secondary device synchronously plays the audio data frame in the audio PCM buffer based on the presentation time stamp of the audio data frame with reference to the STC of the secondary device.

According to the multi-device lip synchronization method provided in this embodiment, the primary device collects the PCR based on the preset cycle, and sends the RTCP packet to the secondary device when determining that the preset condition is met (in other words, time correction needs to be performed), where the RTCP packet carries the collected PCR and the sending time point of the RTCP packet. The secondary device corrects the STC of the secondary device based on the PCR, the program clock frequency of the primary device, the program clock frequency of the secondary device, and the RTCP delay. Then, the secondary device receives, based on the multicast service address and port sent by the primary device, the RTPs published by the primary device, splices the RTPs into the complete audio data frame, obtains, from the time stamp header field of the RTP packet, the presentation time stamp corresponding to the audio data frame, and puts the audio data frame into the PCM buffer of the secondary device. Finally, the secondary device outputs the audio data frame in the audio PCM buffer with reference to the STC of the secondary device and the presentation time stamp of the audio data frame. Therefore, the primary device drives the secondary device, so that audio data and video data are synchronously output. This implements lip synchronization between the primary device and the secondary device, and provides good use experience for a user.

Figure 2:
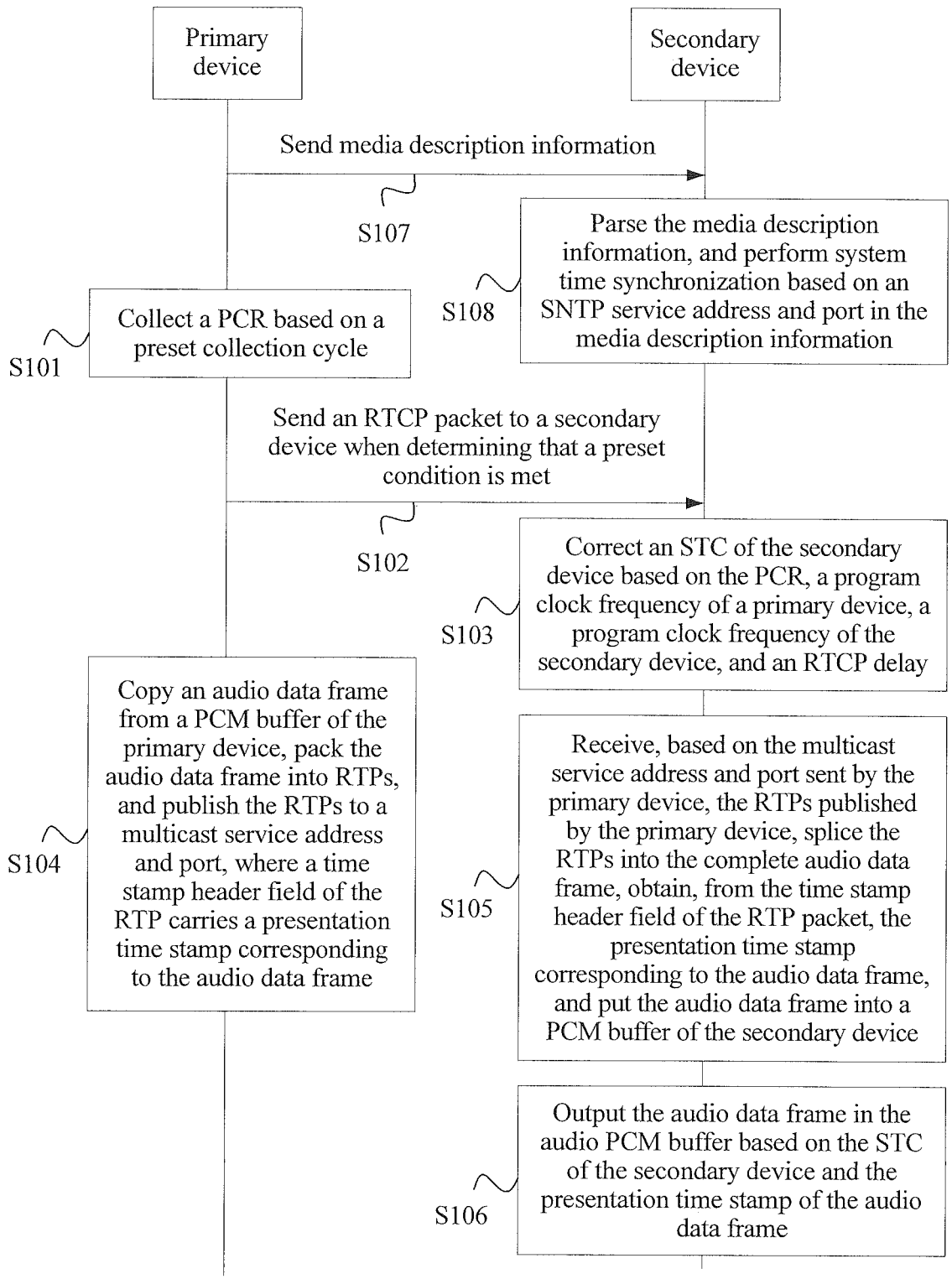
FIG. 2 is a schematic flowchart of Embodiment 2 of a multi-device lip synchronization method according to an embodiment of the present invention.

FIG. 2 is a schematic flowchart of Embodiment 2 of a multi-device lip synchronization method according to an embodiment of the present invention. As shown in FIG. 2, the method in this embodiment is based on the embodiment shown in FIG. 1. If it is not a first time for the secondary device and the primary device to synchronously output audio data and video data, after audio data and video data are synchronously output for the first time, the program clock frequency of the primary device may be stored in the secondary device, and a corresponding identifier of the primary device may also be stored, so that the program clock frequency of the primary device and the identifier of the primary device may be directly used for synchronous output performed for a second time. If it is the first time for the secondary device and the primary device to synchronously output audio data and video data, the primary device needs to send the program clock frequency of the primary device to the secondary device before S103. Likewise, if it is not the first time for the secondary device and the primary device to synchronously output audio data and video data, after audio data and video data are synchronously output for the first time, a Simple Network Time Protocol (SNTP) service address and port used by the secondary device to perform system time synchronization, an RTCP service address and port used by the secondary device to receive the RTCP packet, the multicast service address and port, the program clock frequency of the primary device, a media format, and a time stamp frequency may be stored in the secondary device, and a corresponding identifier of the primary device may also be stored, so that the SNTP service address and port, the RTCP service address and port, the multicast service address and port, the program clock frequency of the primary device, the media format, the time stamp frequency, and the identifier of the primary device may be directly used for synchronous output performed for a second time. If it is the first time for the secondary device and the primary device to synchronously output audio data and video data, before S101, the method may further include the following steps.

S107. The primary device sends media description information to the secondary device, where the media description information includes an SNTP service address and port, an RTCP service address and port, the multicast service address and port, the program clock frequency of the primary device, a media format, and a time stamp frequency. Specifically, the primary device may publish the media description information by using the Hypertext Transfer Protocol.

S108. The secondary device receives the media description information sent by the primary device. The secondary device obtains the SNTP service address and port, the RTCP service address and port, the multicast service address and port, the program clock frequency of the primary device, the media format, and the time stamp frequency by parsing the media description information, performs system time synchronization based on the SNTP service address and port, and then receives, based on the RTCP service address and port, the RTCP packet sent by the primary device. The multicast service address and port are used by the secondary device to receive the RTPs published by the primary device. The media format is a format used by the primary device to perform compression coding on the audio data frame, and is used to by the secondary device to determine a corresponding decoding format. The time stamp frequency is used by the secondary device to adjust a time stamp between two frames of the secondary device based on a time stamp between two frames of the primary device.

A subsequent procedure is the same as that shown in FIG. 1. Details are not described herein again.

According to the multi-device lip synchronization method provided in this embodiment, the primary device sends the media description information to the secondary device, and the secondary device performs system time synchronization based on the SNTP service address and port in the media description information. Then the primary device collects the PCR according to the preset cycle, and sends the RTCP packet to the secondary device when determining that the preset condition is met (in other words, time correction needs to be performed), where the RTCP packet carries the collected PCR and the sending time point of the RTCP packet. The secondary device corrects the STC of the secondary device based on the PCR, the program clock frequency of the primary device, the program clock frequency of the secondary device, and the RTCP delay. Then the secondary device receives, based on the multicast service address and port sent by the primary device, the RTPs published by the primary device, splices the RTPs into the complete audio data frame, obtains, from the time stamp header field of the RTP packet, the presentation time stamp corresponding to the audio data frame, and puts the audio data frame into the PCM buffer of the secondary device. Finally, the secondary device outputs the audio data frame in the audio PCM buffer with reference to the STC of the secondary device and the presentation time stamp of the audio data frame. Therefore, the primary device drives the secondary device, so that audio data and video data are synchronously output. This implements lip synchronization between the primary device and the secondary device, and provides good use experience for a user.

A schematic diagram of a principle of audio output from the primary device to the secondary device is described in detail below with reference to the accompanying drawings, module composition inside the primary device and the secondary device, and an interaction process between modules.

Figure 3:
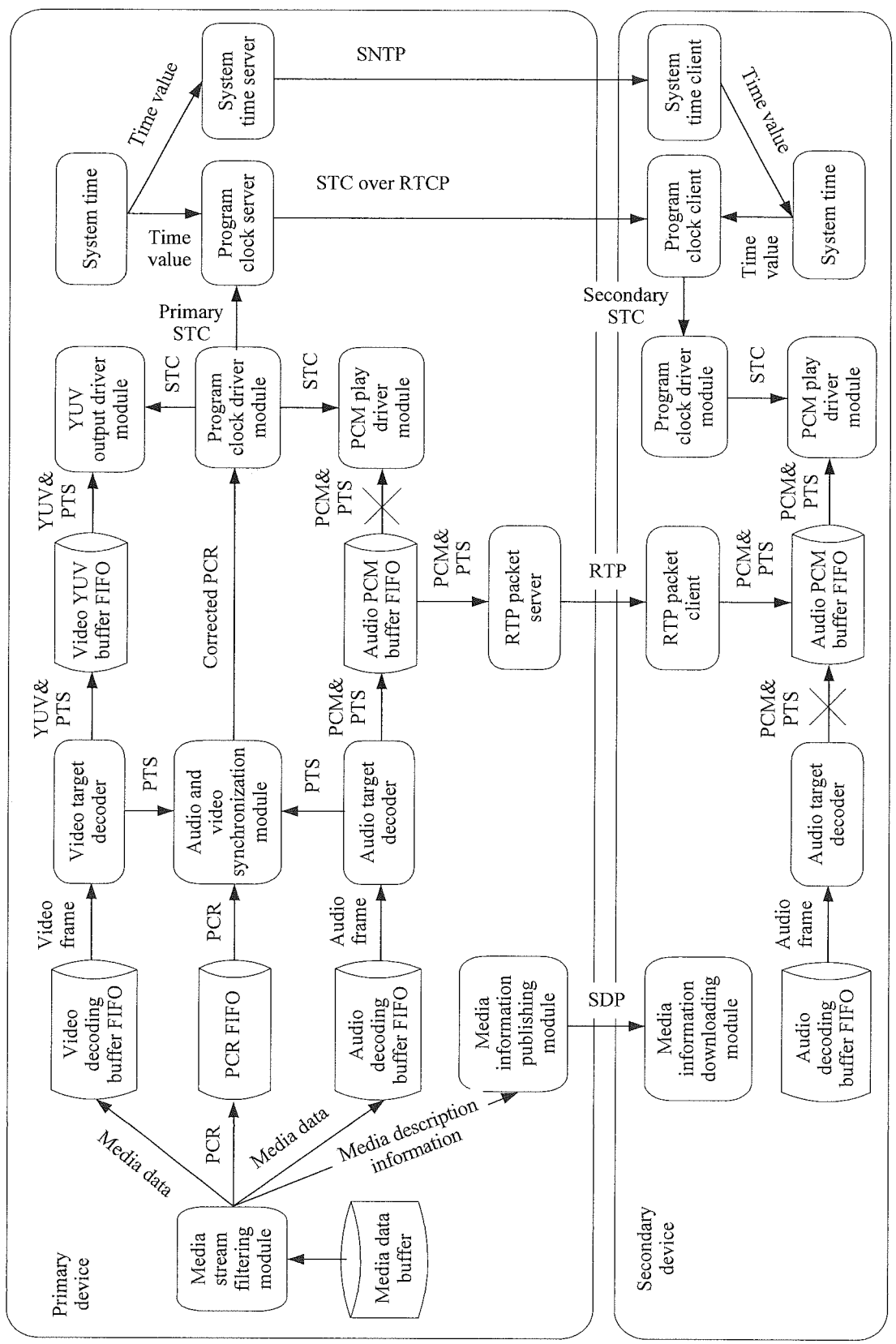
FIG. 3 is a schematic diagram of a principle of a multi-device lip synchronization method according to an embodiment of the present invention.

FIG. 3 is a schematic diagram of a principle of a multi-device lip synchronization method according to an embodiment of the present invention. As shown in FIG. 3, in this embodiment of the present invention, for a primary device, a media information publishing module, a system time server, a program clock server, and an RTP packet server are newly added to an existing primary device (a media player), and for a secondary device, a media information downloading module, a system time client, a program clock client, an RTP packet client, and a program clock driver module are newly added to an existing secondary device. The media information publishing module, the system time server, the program clock server, the RTP packet server, the media information downloading module, the system time client, the program clock client, the RTP packet client, and the program clock driver module each may be a software module. The media information publishing module is configured to publish media description information, where the media description information includes an SNTP service address and port, an RTCP service address and port, a multicast service address and port, a program clock frequency of the primary device, a media format, and a time stamp frequency. The media information downloading module is configured to receive the media description information. The system time server and the system time client implement time synchronization between the secondary device and the primary device. The program clock server and the program clock client implement high-precision synchronization between program clocks of the secondary device and the primary device, for example, ensure that a program clock deviation is less than 20 ms (about a 1-frame PCM output delay). When the program clock client cannot modulate a clock frequency to match the program clock server, corresponding clock frequency conversion needs to be performed on an SCR and a PTS. The RTP packet server and the RTP packet client establish an RTP channel for transmitting an audio data frame from the primary device to the secondary device. The program clock driver module of the secondary device is configured to perform output with reference to a clock of the program clock client when a PCM play driver module plays audio data.

It should be noted that as shown in FIG. 3, after the secondary device is connected to the primary device, an original PCM play driver module of the primary device may be disconnected and not used, and the secondary device plays synchronously output audio. After the secondary device is connected to the primary device, an original audio target decoder and an original audio PCM buffer (FIFO) of the secondary device are also disconnected, and the audio output by the primary device is played.

Specifically, an audio and video synchronization process of the primary device is as follows: An audio and video synchronization module of the primary device calculates a program clock reference value according to a synchronization policy (a PCR reference, a video stream reference, an audio stream reference, or an audio and video reference) of a target program and a lip synchronization algorithm and based on a PCR, an audio presentation time stamp (Presentation Time Stamp, PTS), and a video PTS that are input. Then, the audio and video synchronization module compares the program clock reference value with a current system clock sample (SCR). When an offset exceeds a threshold (which is usually 100 ms to 200 ms), the program clock reference value is used to correct a system clock to obtain a corrected PCR. During output of a media stream such as audio or a video, a display output time sequence of the audio or the video is arranged based on a comparison between a PTS and the SCR. For example, when the PTS is less than or equal to the current sampling SCR, a current audio frame is output; or if the PTS is greater than the current sampling SCR, no audio frame is output. After the primary device is connected to the secondary device, a video is normally output, and audio is not played by using the PCM play driver module, but is output to the secondary device by using the RTP packet server. Then, the secondary device synchronously outputs the audio.

Figure 4:
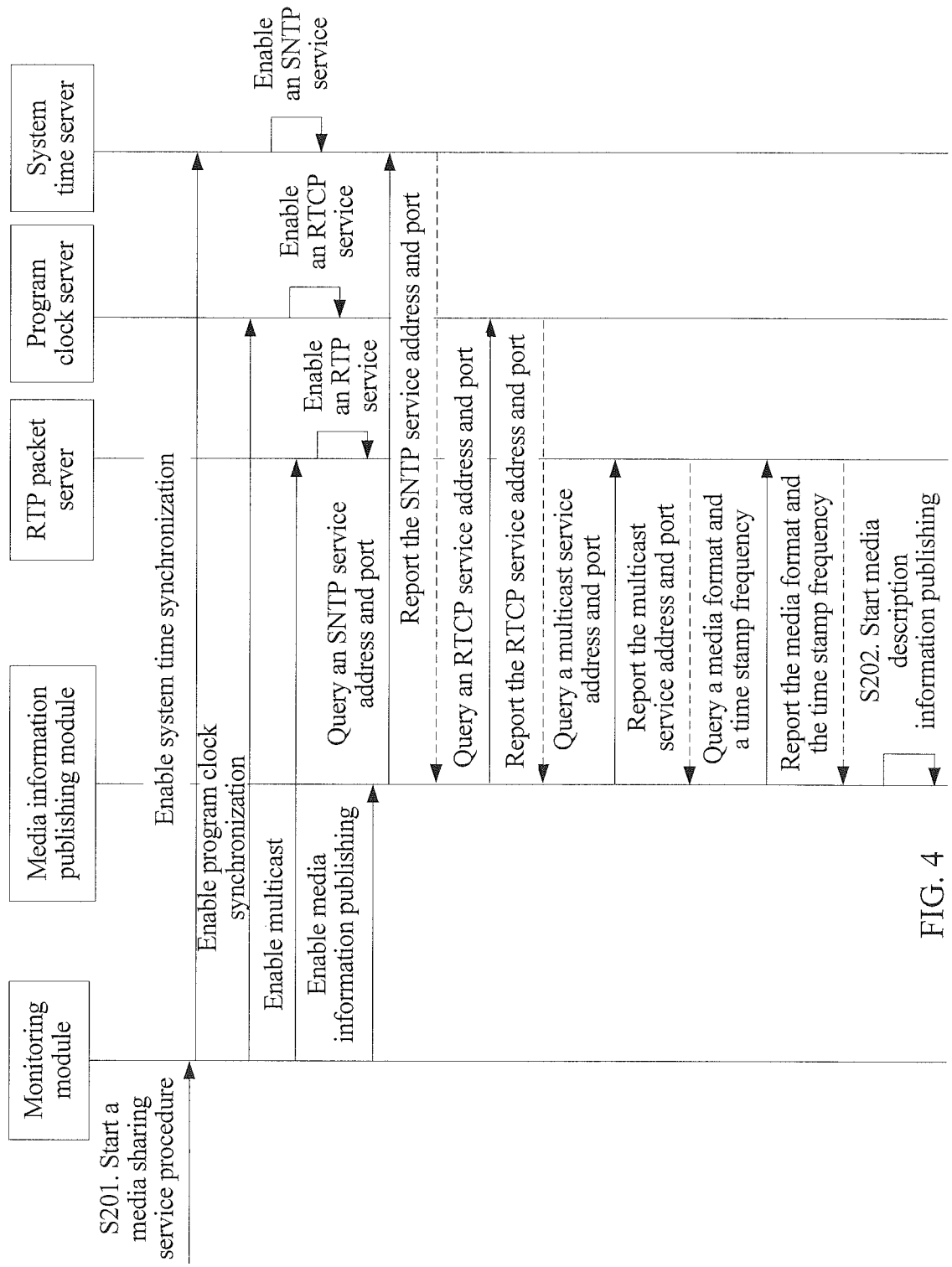
FIG. 4 is a flowchart of interaction between modules when a primary device enables a media sharing service.

FIG. 4 is a flowchart of interaction between modules when a primary device enables a media sharing service. As shown in FIG. 4, the following steps are included.

S201. After a monitoring module of the primary device is connected to a secondary device or finds a secondary device, the monitoring module enables a media sharing service procedure, including: enabling system time synchronization (by a system time server), enabling program clock synchronization (by a program clock server), enabling multicast (by an RTP packet server), and enabling media information publishing (by a media information publishing module).

S202. The media information publishing module publishes media description information, where the media description information includes an SNTP service address and port, an RTCP service address and port, a multicast service address and port, a program clock frequency of the primary device, a media format, and a time stamp frequency.

Then the system time server performs system time synchronization based on the SNTP service address and port. The program clock server receives, based on the RTCP service address and port, an RTCP packet sent by the primary device, and performs program clock synchronization based on the RTCP packet. The RTP packet server publishes RTPs based on the multicast service address and port.

Figure 5:
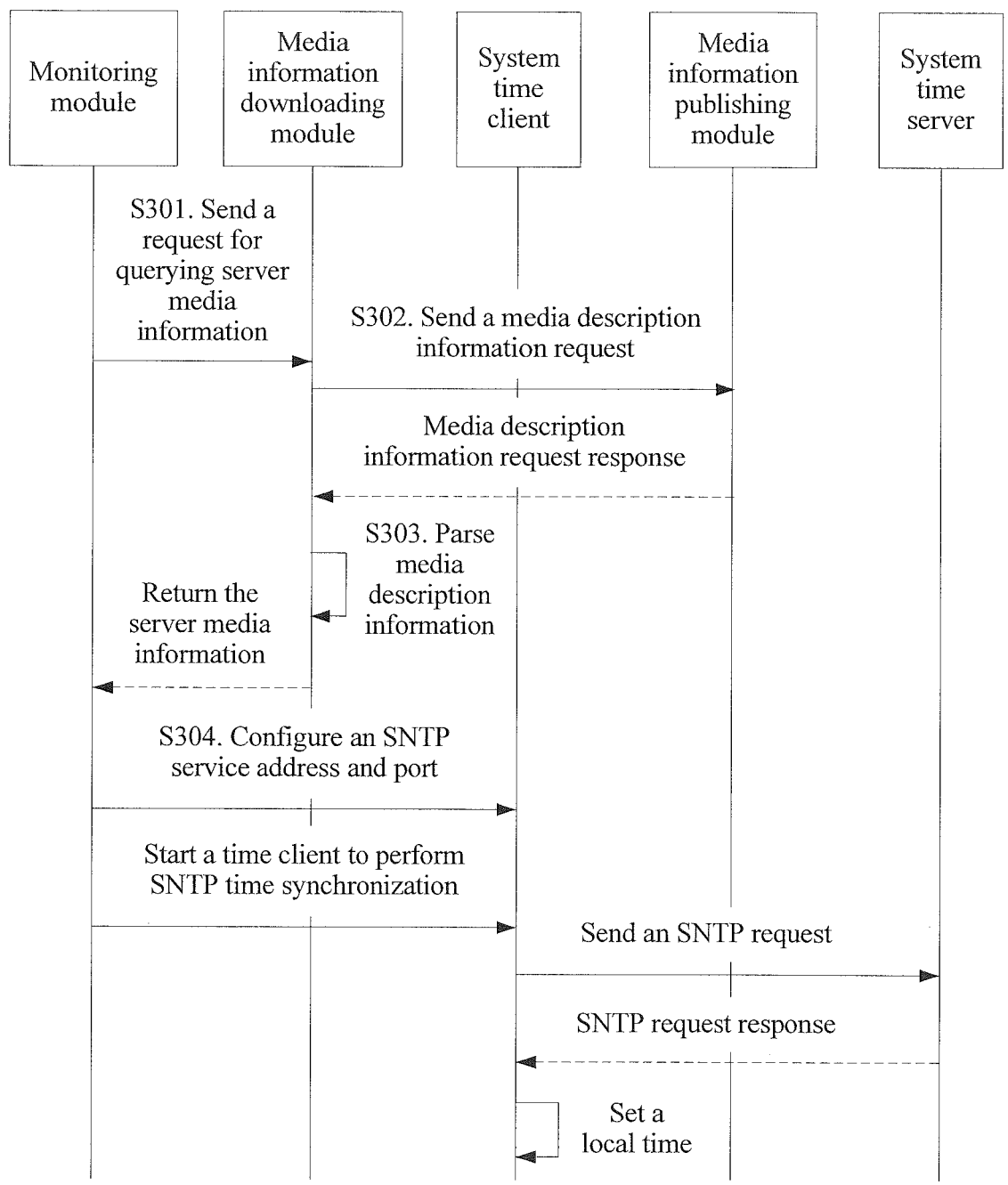
FIG. 5 is a flowchart of interaction between modules when a secondary device queries a shared media resource.

FIG. 5 is a flowchart of interaction between modules when a secondary device queries a shared media resource. As shown in FIG. 5, the following steps are included.

S301. A monitoring module of the secondary device sends a request for querying server media information to a media information downloading module.

S302. The media information downloading module sends a media description information request to a media information publishing module, and the media information publishing module returns a media description information request response that carries media description information, where the media description information includes an SNTP service address and port, an RTCP service address and port, a multicast service address and port, a program clock frequency of a primary device, a media format, and a time stamp frequency.

S303. The media information downloading module parses the media description information to obtain all service addresses and ports, the program clock frequency of the primary device, the media format, and the time stamp frequency.

S304. The monitoring module of the secondary device configures the SNTP service address and port, and starts a time client to perform SNTP time synchronization.

Finally, the time client and a system time server perform time synchronization.

Figure 6:
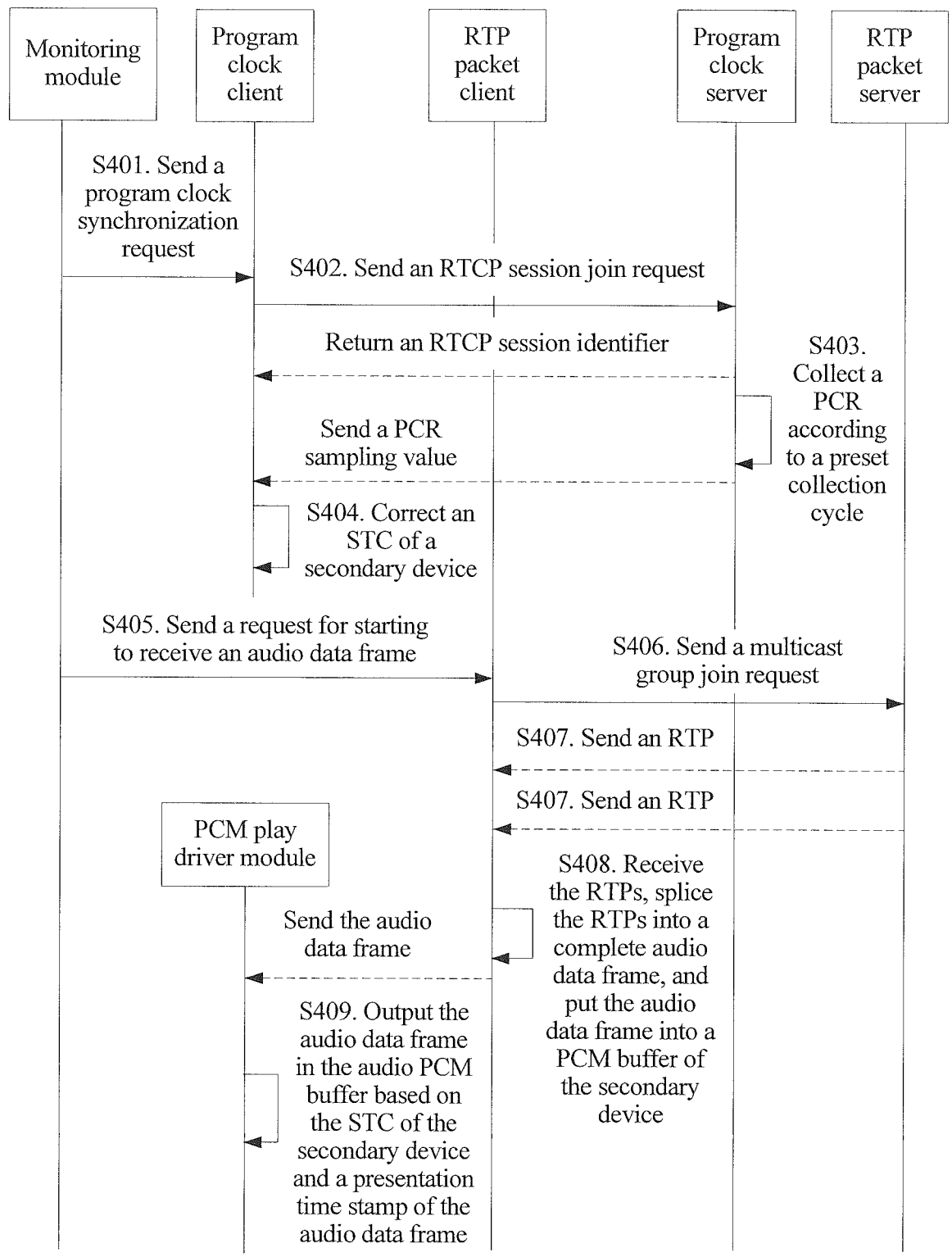
FIG. 6 is a flowchart of interaction between modules when a secondary device synchronously plays a shared media resource.

FIG. 6 is a flowchart of interaction between modules when a secondary device synchronously plays a shared media resource. As shown in FIG. 6, the following steps are included.

S401. A monitoring module of the secondary device sends a program clock synchronization request to a program clock client.

S402. The program clock client sends an RTCP session join request to a program clock server, and the program clock server returns an RTCP session identifier.

S403. The program clock server collects a PCR based on a preset collection cycle, and sends a PCR sampling value to the program clock client when a preset condition is met.

S404. The program clock client corrects an STC of the secondary device based on the PCR, a program clock frequency of a primary device, a program clock frequency of the secondary device, and an RTCP delay.

S405. The monitoring module of the secondary device sends a request for starting to receive an audio data frame to an RTP packet client.

S406. The RTP packet client sends a multicast group join request to an RTP packet server.

S407. The RTP packet server sends RTPs to the RTP packet client.

S408. The RTP packet client receives the RTPs, splices the RTPs into a complete audio data frame, obtains a presentation time stamp corresponding to the audio data frame from a time stamp header field of the RTP packet, and puts the audio data frame into a PCM buffer of the secondary device.

S409. A PCM play driver module outputs the audio data frame in the audio PCM buffer based on the STC of the secondary device and the presentation time stamp of the audio data frame.

In the embodiments of the present invention, function modules of the primary device and the secondary device may be obtained through division based on the foregoing method examples. For example, each function module may be obtained through division based on each function, or two or more functions may be integrated into one processing module. The integrated module may be implemented in a form of hardware, or may be implemented in a form of a software function module. It should be noted that the module division in the embodiments of the present invention is an example, and is merely logical function division. There may be another division manner in actual implementation.

Figure 7:
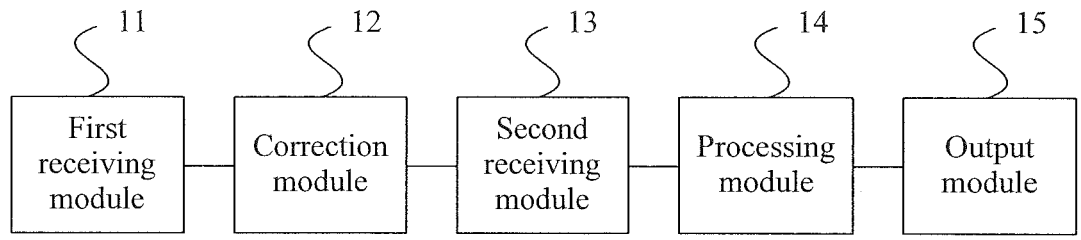
FIG. 7 is a schematic structural diagram of Embodiment 1 of a secondary device according to an embodiment of the present invention.

FIG. 7 is a schematic structural diagram of Embodiment 1 of a secondary device according to an embodiment of the present invention. As shown in FIG. 7, the secondary device in this embodiment may include a first receiving module 11, a correction module 12, a second receiving module 13, a processing module 14, and an output module 15. The first receiving module 11 is configured to receive an RTCP packet sent by a primary device, where an RTP time stamp header field in the RTCP packet carries a program clock reference PCR cyclically collected by the primary device, and a Network Time Protocol NTP field in the RTCP packet carries a sending time point of the RTCP packet. The correction module 12 is configured to correct a system clock STC of the secondary device based on the PCR, a program clock frequency of the primary device, a program clock frequency of the secondary device, and an RTCP delay. The second receiving module 13 is configured to receive, based on a multicast service address and port sent by the primary device, RTPs published by the primary device. The processing module 14 is configured to: splice the RTPs into a complete audio data frame, obtain, from a time stamp header field of the RTP packet, a presentation time stamp PTS corresponding to the audio data frame, and put the audio data frame into an audio pulse code modulation PCM buffer of the secondary device. The output module 15 is configured to output the audio data frame in the audio PCM buffer based on the STC of the secondary device and the presentation time stamp of the audio data frame.

Figure 8:
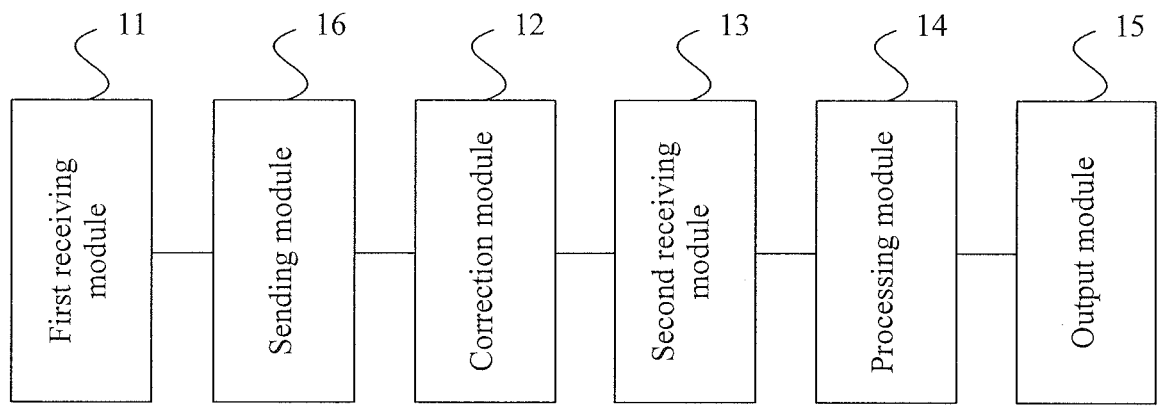
FIG. 8 is a schematic structural diagram of Embodiment 2 of a secondary device according to an embodiment of the present invention.

FIG. 8 is a schematic structural diagram of Embodiment 2 of a secondary device according to an embodiment of the present invention. As shown in FIG. 8, based on the secondary device shown in FIG. 7, further, the secondary device in this embodiment may further include a sending module 16. The sending module 16 is configured to send an RTCP session join request to the primary device before the correction module 12 corrects the system clock STC of the secondary device based on the PCR, the program clock frequency of the primary device, the program clock frequency of the secondary device, and the RTCP delay, so that the primary device sends an RTCP session identifier to the secondary device.

Further, the correction module 12 is specifically configured to: calculate an STC correction value scr_correct of the secondary device according to the following formula:

$$scr\_correct = scr\_srv \times scf\_clt / scf\_srv + (ntp\_rcv - ntp\_snd) \times scf\_clt / 1000, \text{ where}$$

scf_clt is the program clock frequency of the secondary device, scf_srv is the program clock frequency of the primary device, ntp_rcv is a moment at which the RTCP packet is received, and scr_srv and ntp_snd are sending time points of the PCR and the RTCP packet, respectively; and correct the STC of the secondary device based on the calculated STC correction value.

Further, the first receiving module 11 is further configured to: before receiving the Real-Time Control Protocol RTCP packet sent by the primary device, receive media description information sent by the primary device, where the media description information includes an SNTP service address and port, an RTCP service address and port, the multicast service address and port, the program clock frequency of the primary device, a media format, and a time stamp frequency. The processing module 14 is further configured to perform system time synchronization based on the SNTP service address and port. The first receiving module 11 is specifically configured to receive, based on the RTCP service address and port, the RTCP packet sent by the primary device.

The secondary device in the embodiment shown in FIG. 7 or FIG. 8 may be configured to execute the technical solution of the method embodiment shown in FIG. 1 or FIG. 2, and an implementation principle and a technical effect thereof are similar and are not described herein again.

Figure 9:
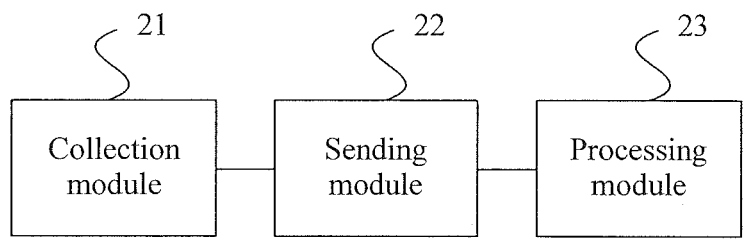
FIG. 9 is a schematic structural diagram of Embodiment 1 of a primary device according to an embodiment of the present invention.

FIG. 9 is a schematic structural diagram of Embodiment 1 of a primary device according to an embodiment of the present invention. As shown in FIG. 9, the primary device in this embodiment may include a collection module 21, a sending module 22, and a processing module 23. The collection module 21 is configured to collect a program clock reference PCR based on a preset collection cycle. The sending module 22 is configured to send a Real-Time Control Protocol RTCP packet to a secondary device when it is determined that a preset condition is met, where a real-time streaming packet RTP time stamp header field in the RTCP packet carries the PCR, and a Network Time Protocol NTP field in the RTCP packet carries a sending time point of the RTCP packet, so that the secondary device corrects a system clock STC of the secondary device based on the PCR, a program clock frequency of the primary device, a program clock frequency of the secondary device, and an RTCP delay. The processing module 23 is configured to: copy an audio data frame from an audio pulse code modulation PCM buffer of the primary device, pack the audio data frame into real-time streaming packets RTPs, and publish the RTPs to a multicast service address and port, where a time stamp header field of the RTP carries a presentation time stamp corresponding to the audio data frame, so that the secondary device receives the RTPs based on the multicast service address and port.

Figure 10:
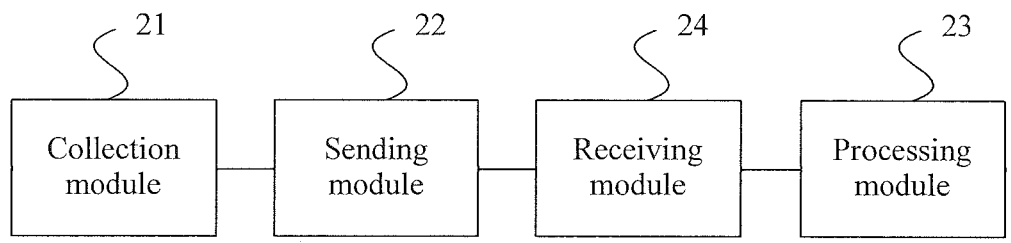
FIG. 10 is a schematic structural diagram of Embodiment 2 of a primary device according to an embodiment of the present invention.

FIG. 10 is a schematic structural diagram of Embodiment 2 of a primary device according to an embodiment of the present invention. As shown in FIG. 10, based on the primary device shown in FIG. 9, further, the primary device in this embodiment may further include a receiving module 24. The receiving module 24 is configured to: before the sending module 22 sends the RTCP packet to the secondary device when it is determined that the preset condition is met, receive an RTCP session join request sent by the secondary device, and send an RTCP session identifier to the secondary device.

Further, the sending module 22 is further configured to: send media description information to the secondary device before the collection module 21 collects the program clock reference PCR based on the preset collection cycle, where the media description information includes an SNTP service address and port, an RTCP service address and port, the multicast service address and port, the program clock frequency of the primary device, a media format, and a time stamp frequency, the SNTP service address and port is used by the secondary device to perform system time synchronization, and the RTCP service address and port is used by the secondary device to receive, based on the RTCP service address and port, the RTCP packet sent by the primary device.

The preset condition is: a deviation between an actual PCR collection time interval of the primary device and the preset collection cycle is greater than a preset threshold.

Optionally, the preset threshold is 20 ms, and the preset condition is:

$$(scr\_curr-scr\_last) \times 1000/scf\_srv < (cycle\_read\_x-20);$$
or
$$(scr\_curr-scr\_last) \times 1000/scf\_srv > (cycle\_read\_x+20),$$
where scr_curr is a currently collected clock value, scr_last is a previously collected clock value, scf_srv is the program clock frequency of the primary device, and cycle_read_x is the preset collection cycle.

The primary device in the embodiments shown in FIG. 9 and FIG. 10 may be configured to execute the technical solution of the method embodiment shown in FIG. 1 or FIG. 2, and an implementation principle and a technical effect thereof are similar and are not described herein again.

Figure 11:
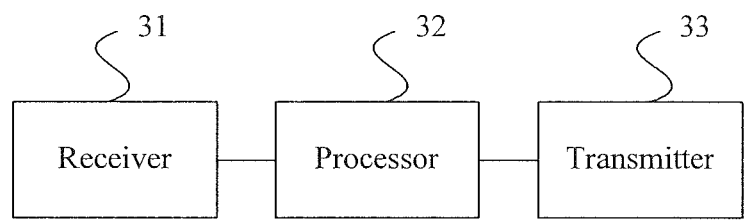
FIG. 11 is a schematic structural diagram of Embodiment 3 of a secondary device according to an embodiment of the present invention.

FIG. 11 is a schematic structural diagram of Embodiment 3 of a secondary device according to an embodiment of the present invention. As shown in FIG. 11, the secondary device in this embodiment may include a receiver 31, a processor 32, and a transmitter 33. The receiver 31 is configured to receive an RTCP packet sent by a primary device, where an RTP time stamp header field in the RTCP packet carries a program clock reference PCR cyclically collected by the primary device, and a Network Time Protocol NTP field in the RTCP packet carries a sending time point of the RTCP packet. The processor 32 is configured to correct a system clock STC of the secondary device based on the PCR, a program clock frequency of the primary device, a program clock frequency of the secondary device, and an RTCP delay. The receiver 31 is further configured to receive, based on a multicast service address and port sent by the primary device, RTPs published by the primary device. The processor 32 is further configured to: splice the RTPs into a complete audio data frame, obtain, from a time stamp header field of the RTP packet, a presentation time stamp PTS corresponding to the audio data frame, and put the audio data frame into an audio pulse code modulation PCM buffer of the secondary device. The transmitter 33 is configured to output the audio data frame in the audio PCM buffer based on the STC of the secondary device and the presentation time stamp of the audio data frame.

Further, the transmitter 33 is further configured to send an RTCP session join request to the primary device before the correction module corrects the system clock STC of the secondary device based on the PCR, the program clock frequency of the primary device, the program clock frequency of the secondary device, and the RTCP delay, so that the primary device sends an RTCP session identifier to the secondary device.

Further, the processor 32 is specifically configured to: calculate an STC correction value scr_correct of the secondary device according to the following formula:

$$scr\_correct = scr\_srv \times scf\_clt/scf\_srv + (ntp\_rcv - ntp\_snd) \times scf\_clt/1000, \text{ where}$$

scf_clt is the program clock frequency of the secondary device, scf_srv is the program clock frequency of the primary device, ntp_rcv is a moment at which the RTCP packet is received, and scr_srv and ntp_snd are sending time points of the PCR and the RTCP packet, respectively; and correct the STC of the secondary device based on the calculated STC correction value.

Further, the receiver 31 is further configured to: before receiving the Real-Time Control Protocol RTCP packet sent by the primary device, receive media description information sent by the primary device, where the media description information includes an SNTP service address and port, an RTCP service address and port, the multicast service address and port, the program clock frequency of the primary device, a media format, and a time stamp frequency. The processor 32 is further configured to perform system time synchronization based on the SNTP service address and port. The receiver 31 is specifically configured to receive, based on the RTCP service address and port, the RTCP packet sent by the primary device.

The secondary device in this embodiment may be configured to execute the technical solution of the method embodiment shown in FIG. 1 or FIG. 2, and an implementation principle and a technical effect thereof are similar and are not described herein again.

Figure 12:
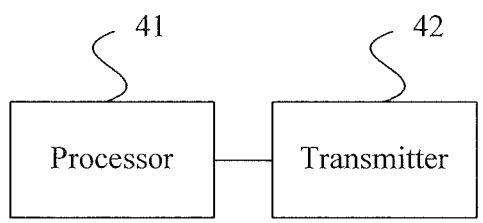
FIG. 12 is a schematic structural diagram of Embodiment 3 of a primary device according to an embodiment of the present invention.

FIG. 12 is a schematic structural diagram of Embodiment 3 of a primary device according to an embodiment of the present invention. As shown in FIG. 12, the primary device in this embodiment may include a processor 41 and a transmitter 42. The processor 41 is configured to collect a program clock reference PCR based on a preset collection cycle. The transmitter 42 is configured to send a Real-Time Control Protocol RTCP packet to a secondary device when it is determined that a preset condition is met, where a real-time streaming packet RTP time stamp header field in the RTCP packet carries the PCR, and a Network Time Protocol NTP field in the RTCP packet carries a sending time point of the RTCP packet, so that the secondary device corrects a system clock STC of the secondary device based on the PCR, a program clock frequency of the primary device, a program clock frequency of the secondary device, and an RTCP delay. The processor 41 is further configured to: copy an audio data frame from an audio pulse code modulation PCM buffer of the primary device, pack the audio data frame into real-time streaming packets RTPs, and publish the RTPs to a multicast service address and port, where a time stamp header field of the RTP carries a presentation time stamp corresponding to the audio data frame, so that the secondary device receives the RTPs based on the multicast service address and port.

Figure 13:
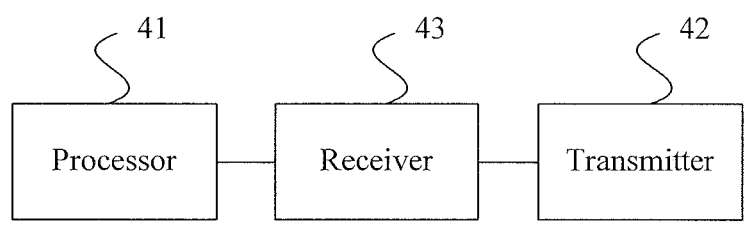
FIG. 13 is a schematic structural diagram of Embodiment 4 of a primary device according to an embodiment of the present invention.

FIG. 13 is a schematic structural diagram of Embodiment 4 of a primary device according to an embodiment of the present invention. As shown in FIG. 13, based on the primary device shown in FIG. 12, further, the primary device in this embodiment may further include a receiver 43. The receiver 43 is configured to: before the transmitter 42 sends the RTCP packet to the secondary device when it is determined that the preset condition is met, receive an RTCP session join request sent by the secondary device, and send an RTCP session identifier to the secondary device.

Further, the transmitter 42 is further configured to: send media description information to the secondary device before the processor 41 collects the program clock reference PCR based on the preset collection cycle, where the media description information includes an SNTP service address and port, an RTCP service address and port, the multicast service address and port, the program clock frequency of the primary device, a media format, and a time stamp frequency, the SNTP service address and port is used by the secondary device to perform system time synchronization, and the RTCP service address and port is used by the secondary device to receive, based on the RTCP service address and port, the RTCP packet sent by the primary device.

The preset condition is: a deviation between an actual PCR collection time interval of the primary device and the preset collection cycle is greater than a preset threshold.

Optionally, the preset threshold is 20 ms, and the preset condition is:

(scr_curr−scr_last)×1000/scf_srv<(cycle_read_x−20);
or (scr_curr−scr_last)×1000/scf_srv>(cycle_read_x+20),
where scr_curr is a currently collected clock value, scr_last is a previously collected clock value, scf_srv is the program clock frequency of the primary device, and cycle_read_x is the preset collection cycle.

The primary device in the embodiments shown in FIG. 12 and FIG. 13 may be configured to execute the technical solution of the method embodiment shown in FIG. 1 or FIG. 2, and an implementation principle and a technical effect thereof are similar and are not described herein again.

The embodiments in this specification are all described in a progressive manner, for same or similar parts in the embodiments, refer to these embodiments. Each embodiment focuses on a difference from other embodiments. Especially, a system or apparatus embodiment is basically similar to a method embodiment, and therefore is described briefly. For related parts, refer to partial descriptions in the method embodiment.

A person of ordinary skill in the art may understand that each aspect of the embodiments of the present invention or a possible implementation of each aspect may be specifically implemented as a system, a method, or a computer program product. Therefore, each aspect of the embodiments of the present invention or a possible implementation of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the embodiments of the present invention or the possible implementation of each aspect may take a form of a computer program product, where the computer program product is computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read-only memory (CD-ROM).

A processor in a computer reads the computer-readable program code stored in the computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a local computer of a user, or some may be executed on a local computer of a user as a standalone software package, or some may be executed on a local computer of a user while some is executed on a remote computer, or all the code may be executed on a remote computer or a server. It should also be noted that in some alternative implementation solutions, each step in the flowcharts or functions specified in each block in the block diagrams may not occur in the illustrated order. For example, two steps or blocks that depend on a function and are shown in sequence may be actually executed concurrently, or sometimes these blocks may be executed in reverse order.

What is claimed is:

1. A system, comprising:
a primary device; and
at least one secondary device;
wherein:
the primary device outputs video and the at least one secondary device outputs audio;
the primary device is connected to the at least one secondary device through Wi-Fi or Bluetooth;
the primary device is configured to collect a program clock reference (PCR) based on a preset collection cycle;
the primary device is configured to send a Real-Time Transport Control Protocol (RTCP) packet to each of the at least one secondary device when determining that a preset condition is met, wherein a Real-Time Transport Protocol (RTP) time stamp header field in the RTCP packet carries the PCR, and a Network Time Protocol (NTP) field in the RTCP packet carries a sending time point of the RTCP packet;
each of the at least one secondary device is configured to receive the RTCP packet and correct a system clock (STC) of the secondary device based on the PCR, a program clock frequency of the primary device, a program clock frequency of the secondary device, and an RTCP delay;
the primary device is configured to copy an audio data frame from an audio pulse code modulation (PCM) buffer of the primary device, pack the audio data frame into Real-Time Transport Protocols (RTPs), and publish the RTPs to a multicast service address and port, wherein a time stamp header field of the RTP carries a presentation time stamp corresponding to the audio data frame;
each of the at least one secondary device is configured to receive the RTPs, splice the RTPs into a complete audio data frame, obtain, from a time stamp header field of the RTP packet, a presentation time stamp (PTS) corresponding to the audio data frame, and store the audio data frame into an audio pulse code modulation (PCM) buffer of the secondary device;
each of the at least one secondary device is configured to output the audio data frame in the audio PCM buffer based on the STC of the secondary device and the presentation time stamp of the audio data frame to implement lip synchronization; and the RTCP packet carries an RTCP session identifier, wherein:

each of the at least one secondary device is configured to send an RTCP session join request to the primary device before the primary device sends the RTCP packet; and the primary device is configured to receive the RTCP session join request and send the RTCP session identifier to the secondary device.

2. The system according to claim 1, wherein before the primary device collects the PCR, the primary device is configured to send media description information to the secondary device, wherein the media description information comprises a Simple Network Time Protocol (SNTP) service address and port, an RTCP service address and port, the multicast service address and port, the program clock frequency of the primary device, a media format, and a time stamp frequency, the SNTP service address and port is used by the secondary device to perform system time synchronization, and the RTCP service address and port is used by the secondary device to receive, based on the RTCP service address and port, the RTCP packet sent by the primary device;

wherein the secondary device is configured to receive the media description information, perform system time synchronization based on the SNTP service address and port; and wherein the receiving the RTCP packet comprises receiving the RTCP packet based on the RTCP service address and port.

3. The system according to claim 1, wherein the preset condition is:

a deviation between an actual PCR collection time interval of the primary device and the preset collection cycle is greater than a preset threshold.

4. The system according to claim 3, wherein the preset threshold is 20 ms, and the preset condition is:

(scr_curr−scr_last)×1000/scf_srv<(cycle_read_x−20);
or (scr_curr−scr_last)×1000/scf_srv>(cycle_read_x+20),
wherein scr_curr is a currently collected clock value, scr_last is a previously collected clock value, scf_srv is the program clock frequency of the primary device, and cycle_read_x is the preset collection cycle.

5. The system according to claim 1, wherein the correcting the STC of the secondary device comprises:

calculating an STC correction value scr_correct of the secondary device according to the following formula:

scr_correct=scr_srv×scf_clt/scf_srv+(ntp_rcv−ntp_snd)×scf_clt/1000, wherein scf_clt is the program clock frequency of the secondary device, scf_srv is the program clock frequency of the primary device, ntp_rcv is a moment at which the RTCP packet is received, and scr_srv and ntp_snd are sending time points of the PCR and the RTCP packet, respectively; and correcting the STC of the secondary device based on the calculated STC correction value.

6. The system according to claim 1, wherein the primary device is one of a mobile phone, a Set-Top Box (STB), or an Over The Top (OTT).

7. The system according to claim 1, the secondary device is a Wi-Fi speaker.

8. A multi-device lip synchronization method applied to a primary device and at least one secondary device to synchronously output video and audio, wherein the primary device outputs the video and the at least one secondary device outputs the audio, wherein the primary device is connected to the at least one secondary device through Wi-Fi, and the method comprises:

receiving, by the secondary device, a Real-Time Transport Control Protocol (RTCP) packet sent by the primary device, wherein a Real-Time Transport Protocol (RTP) time stamp header field in the RTCP packet carries a program clock reference (PCR) cyclically collected by the primary device, and a Network Time Protocol (NTP) field in the RTCP packet carries a sending time point of the RTCP packet;

correcting, by the secondary device, a system clock (STC) of the secondary device based on the PCR, a program clock frequency of the primary device, a program clock frequency of the secondary device, and an RTCP delay;

receiving, by the secondary device based on a multicast service address and port sent by the primary device, RTPs published by the primary device, splicing the RTPs into a complete audio data frame, obtaining, from a time stamp header field of the RTP packet, a presentation time stamp (PTS) corresponding to the audio data frame, and storing the audio data frame into an audio pulse code modulation (PCM) buffer of the secondary device; and outputting, by the secondary device, the audio data frame in the audio PCM buffer based on the STC of the secondary device and the presentation time stamp of the audio data frame to implement lip synchronization;

wherein the RTCP packet carries an RTCP session identifier, and before the correcting, by the secondary device, a system clock (STC) of the secondary device based on the PCR, a program clock frequency of the primary device, a program clock frequency of the secondary device, and an RTCP delay, the method further comprises:

sending, by the secondary device, an RTCP session join request to the primary device, so that the primary device sends the RTCP session identifier to the secondary device.

9. The method according to claim 8, wherein the correcting, by the secondary device, the system clock (STC) of the secondary device based on the PCR, the program clock frequency of the primary device, the program clock frequency of the secondary device, and an RTCP delay comprises:

calculating, by the secondary device, an STC correction value scr_correct of the secondary device according to the following formula:

scr_correct=scr_srv×scf_clt/scf_srv+(ntp_rcv−ntp_snd)×scf_clt/1000, wherein scf_clt is the program clock frequency of the secondary device, scf_srv is the program clock frequency of the primary device, ntp_rcv is a moment at which the RTCP packet is received, and scr_srv and ntp_snd are sending time points of the PCR and the RTCP packet, respectively; and correcting, by the secondary device, the STC of the secondary device based on the calculated STC correction value.

10. The method according to claim 8, wherein before the receiving, by the secondary device, a Real-Time Transport Control Protocol (RTCP) packet sent by the primary device, the method further comprises:
  receiving, by the secondary device, media description information sent by the primary device, wherein the media description information comprises a Simple Network Time Protocol (SNTP) service address and port, an RTCP service address and port, the multicast service address and port, the program clock frequency of the primary device, a media format, and a time stamp frequency;
  performing, by the secondary device, system time synchronization based on the SNTP service address and port; and
  the receiving, by the secondary device, the Real-Time Transport Control Protocol (RTCP) packet sent by the primary device comprises:
  receiving, by the secondary device based on the RTCP service address and port, the RTCP packet sent by the primary device.

11. The method according to claim 8, wherein the secondary device is a Wi-Fi speaker.

12. A multi-device lip synchronization method, wherein the method is applied to a primary device and at least one secondary device to synchronously output video and audio, wherein the primary device outputs video and the at least one secondary device outputs audio, wherein the primary device is connected to the at least one secondary device through Wi-Fi, and the method comprises:
  collecting, by the primary device, a program clock reference (PCR) based on a preset collection cycle;
  sending, by the primary device, a Real-Time Transport Control Protocol (RTCP) packet to the secondary device when determining that a preset condition is met, wherein a Real-Time Transport Protocol (RTP) time stamp header field in the RTCP packet carries the PCR, and a Network Time Protocol (NTP) field in the RTCP packet carries a sending time point of the RTCP packet, so that the secondary device corrects a system clock (STC) of the secondary device based on the PCR, a program clock frequency of the primary device, a program clock frequency of the secondary device, and an RTCP delay; and
  copying, by the primary device, an audio data frame from an audio pulse code modulation (PCM) buffer of the primary device, packing the audio data frame into Real-Time Transport Protocols (RTPs), and publishing the RTPs to a multicast service address and port, wherein a time stamp header field of the RTP carries a presentation time stamp corresponding to the audio data frame, so that the secondary device receives the RTPs based on the multicast service address and port;
  wherein the RTCP packet carries an RTCP session identifier, and before the sending, by the primary device, the Real-Time Transport Control Protocol (RTCP) packet to the secondary device when determining that the preset condition is met, the method further comprises:
  receiving, by the primary device, an RTCP session join request sent by the secondary device, and sending the RTCP session identifier to the secondary device.

13. The method according to claim 12, wherein before the collecting, by the primary device, the program clock reference (PCR) based on a preset collection cycle, the method further comprises:
  sending, by the primary device, media description information to the secondary device, wherein the media description information comprises a Simple Network Time Protocol (SNTP) service address and port, an RTCP service address and port, the multicast service address and port, the program clock frequency of the primary device, a media format, and a time stamp frequency, the SNTP service address and port is used by the secondary device to perform system time synchronization, and the RTCP service address and port is used by the secondary device to receive, based on the RTCP service address and port, the RTCP packet sent by the primary device.

14. The method according to claim 12, wherein the preset condition is:
  a deviation between an actual PCR collection time interval of the primary device and the preset collection cycle is greater than a preset threshold.

15. The method according to claim 14, wherein the preset threshold is 20 ms, and the preset condition is:

$$(scr\_curr - scr\_last) \times 1000/scf\_srv < (cycle\_read\_x - 20);$$
or
$$(scr\_curr - scr\_last) \times 1000/scf\_srv > (cycle\_read\_x + 20),$$
wherein scr_curr is a currently collected clock value, scr_last is a previously collected clock value, scf_srv is the program clock frequency of the primary device, and cycle_read_x is the preset collection cycle.

16. The method according to claim 12, the primary device is one of a mobile phone, a Set-Top Box (STB), or an Over The Top (OTT).

* * * * *